R. D. O. Smith,
Calipers.

No. 45529.    Patented Dec. 20. 1864.

Witnesses.
R. J. Dodge
Andrew Whiteley

Inventor
R. D. O. Smith

UNITED STATES PATENT OFFICE.

ROBERT D. O. SMITH, OF WASHINGTON, DISTRICT OF COLUMBIA.

IMPROVEMENT IN CALIPERS.

Specification forming part of Letters Patent No. 45,529, dated December 20, 1864.

*To all whom it may concern:*

Be it known that I, ROBERT D. O. SMITH, of the city of Washington and District of Columbia, have invented a new and Improved Mode of Constructing Calipers; and I hereby declare the following to be a full, clear, and exact description of the same, reference being had to the accompanying drawings, in which—

Figure 1:
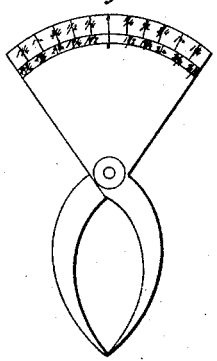
Figure 5:
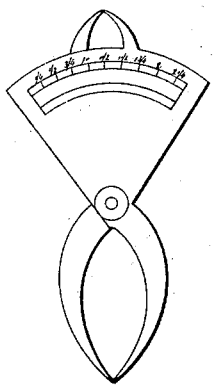
Figure 4:
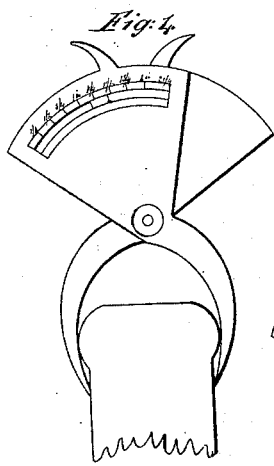
Figure 2:
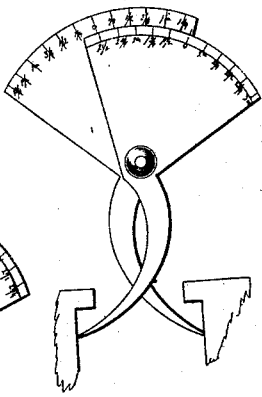
Figure 3:
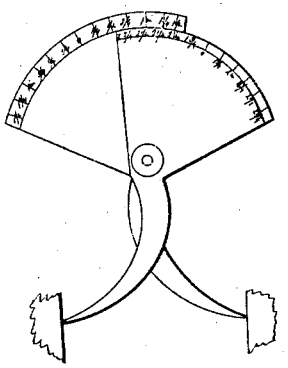

Figures 1, 2, and 3 exhibit my improved calipers in various positions; and Figs. 4 and 5 exhibit another form of the instrument provided with supplemental points.

The nature of my invention consists in providing calipers having only a single pair of legs with a double scale, so that the same instrument can be used either for inside or outside measurements, and the diameter determined immediately without the aid of any other instrument.

I construct my instrument with legs of the ordinary shape, but with the upper end, or that part beyond the joint, flattened and extended into a broad plate, as shown in Fig. 1, the end or outer edge describing the arc of a circle whose center is the center of the pivot upon which the legs move, and the two side edges forming an angle to each other of about ninety degrees. One of these plates is shorter than the other, and its outer edge therefore forms an arc of a smaller circle. This edge may be chamfered thin for the purpose of more conveniently having a scale marked upon it. The center line, *o*, cutting both plates, is the zero-point, and measurements for outside work run one way from this point, while the measurements for inside run the other way, as will be understood without difficulty by reference to the red lines marking the "inside" graduations, and black lines marking "outside" graduations in Figs. 1, 2, 3. The scales may represent any subdivisions of the inch or other standard, as may be desired. For convenience of illustration the subdivisions shown in the drawings are one-quarter inches only. I construct the scales in the following manner: The zero-point *o* is at the center of each scale, so that when the zero of one scale coincides with the zero of the other then the points of the legs touch each other, as in Fig. 1. If now the points of the legs be moved asunder—say one-quarter inch—the zero-point of the smaller or inner scale moves over the larger arc a distance indicated by the quantity ¼, at the left of the zero point of the large scale, and so on for each additional distance. When the zero-point of the smaller scale has reached the last graduation marked upon the larger arc, as in Fig. 2, then said last graduation becomes the zero-point, as seen in Fig. 2, and as the legs are opened still farther asunder the scale is transferred to the smaller arc, as shown in Fig. 3, in which the distance indicated is two inches. In short, the distance indicated in regular order between the zero point of the large scale and the zero-point of the small one is the distance which separates the points of the legs.

Figure 6:
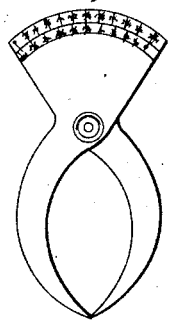

If desired, the two scales may be separated entirely, one being put upon the larger arc, and the other being put upon the smaller one, as shown in Fig. 6. The zero-points are then placed upon the end of each scale, respectively. Though this plan may appear most simple, I think it more likely to lead to mistakes than the method illustrated by Figs. 1, 2, and 3.

If desired, supplemental points may be added, as in Figs. 4 and 5, which, in the well-known manner, will indicate the same diameter as the main points, but from an opposite position, as shown in Fig. 4, so that when the main points measure an outside diameter these points will measure the same diameter inside. In case these supplemental points are used, but one scale need be constructed—*i. e.*, for outside measurements.

The advantages to be gained by my improvements consist, first, in the facility with which diameters, either internal or external, may be measured without the aid of a rule or detached scale; and, secondly, in the power of the instrument to determine diameters which otherwise would be inaccessible, as in Figs. 2 and 4, the instrument in Fig. 2 being represented in the act of measuring the interior diameter of a cavity whose mouth or orifice is much smaller than the point to be measured, and Fig. 4 representing the instrument as straddling over a projecting edge to measure a diameter behind it, the diameter in either case being read while the points are resting upon the surface whose distance asunder it is desired to measure.

I am aware that calipers have been made with a single scale and a pointer, so that an instrument might be made to measure either outside or inside diameters and indicate the same by means of the said scale; but I am not aware that any instrument has been made combining both these capabilities in one instrument.

In speaking of calipers, I desire to be understood as referring only to calipers of the common form with bent legs, as represented, and turning upon a pivot.

Having described my invention, what I claim as new, and desire to secure by Letters Patent, is—

1. Calipers having only one pair of legs and provided with two scales, so that the same pair of legs may be used for either inside or outside measurements, and the diameters measured be determined by said scales without the aid of rule or detached scale, substantially as described.

2. A double scale for calipers with a single pair of legs when one-half of each scale is upon one blade, and the other half of each scale is upon the other blade, of the calipers, substantially as described.

R. D. O. SMITH.

Witnesses:
ANDREW WHITELEY,
W. C. DODGE.